United States Patent [19]

Jensen

[11] Patent Number: 5,008,850

[45] Date of Patent: Apr. 16, 1991

[54] CIRCUITRY FOR MULTIPLYING BINARY NUMBERS

[75] Inventor: Eric H. Jensen, Livermore, Calif.

[73] Assignee: Sun Microsystems, Inc., Mountain View, Calif.

[21] Appl. No.: 528,937

[22] Filed: May 25, 1990

[51] Int. Cl.$^5$ .............................................. G06F 7/52
[52] U.S. Cl. .................................................. 364/760
[58] Field of Search ................ 364/760, 759, 757, 754

[56] References Cited

U.S. PATENT DOCUMENTS 4,864,528 9/1989 Nishiyama et al. ............. 364/760 X

OTHER PUBLICATIONS

Blaauw et al., "Binary Multiplicatoin", IBM Tech. Discl. Bull., vol. 4, No. 11, Apr. 1962, pp. 32–34.
IBM Tech. Discl. Bull., vol. 27, No. 11, Apr. 1985, pp. 6624–6632, "Improved Approach to the Use of Booth's Multiplication Algorithm".

*Primary Examiner*—Dale M. Shaw
*Assistant Examiner*—Tan V. Mai
*Attorney, Agent, or Firm*—Blakely Sokoloff Taylor & Zafman

[57] ABSTRACT

A circuit for multiplying two binary numbers including apparatus for sorting one of the binary numbers into groups of variable lengths, each group including all contiguous ones beginning at the lowest order bit and all contiguous zeroes beginning with the highest order one of the group; apparatus for selecting for each group starting with the lowest order group of bits a binary number equal to the value of the other one of the binary numbers multiplied by a selected binary number consisting of ones; apparatus for shifting the selected number right a number of bits equal to the number of zeros in the group; apparatus for adding a next binary number equal to the value of the other one of the binary numbers multiplied by a selected binary number consisting of ones equal to the number of ones in an individual group to the partial product for each remaining group; apparatus for shifting the partial result of the addition right a number of bits equal to the number of zeroes in the each group after the addition of each selected number.

40 Claims, 2 Drawing Sheets

CIRCUITRY FOR MULTIPLYING BINARY NUMBERS

BACKGROUND OF THE INVENTION

1. Field of the Invention

This invention relates to logic circuitry and, more particularly, to apparatus for rapidly multiplying binary numbers in a computer system.

2. History of the Prior Art

The typical method of multiplying two binary numbers takes one of the numbers, multiplies it by each of the bits (a one or a zero) of the other number in order starting with the lowest order bit, adding the multiplied value at each step to the high order bits of the partial product from each previous step and shifting the result right by one bit. This operation is quite time consuming.

SUMMARY OF THE INVENTION

It is, therefore, an object of the present invention to provide new circuitry for rapidly multiplying binary numbers.

These and other objects of the present invention are realized in a circuit which multiplies two binary numbers by exploiting the fact that all binary numbers consist of one or more ordered groups of varying number of ordered bits of ones and zeros, where the one bits are all contiguous in the lower order bits and the zero bits are all contiguous in the higher order bits. The circuit virtually generates a partial product for each of these groups based on the number of contiguous one bits in the lower order bits of each of these groups. The circuit starts with the lowest ordered group and move towards the higher order groups, until the entire first binary number is traversed. The circuit accumulates these virtually generated partial products to arrive at the final product.

The circuit virtually generates the partial products for these groups by generating partial products for fixed length subsets of one of the binary numbers. The circuit generates a partical product for each of these fixed length subsets based on the number of contiguous one bits in the lower order bits. The circuit starts with the lowest ordered fixed length subset of one of the binary numbers and move towards the higher ordered fixed length subsets, offsetting the next fixed length subset from the previous fixed length subset by a number of bits, until the entire binary number is traversed. The number of bits offsetted each time equals the total number of contiguous one bits in the lower order bits of the previous fixed length subset and the number of contiguous zero bits immediately following the contiguous one bits.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

Figure 1:
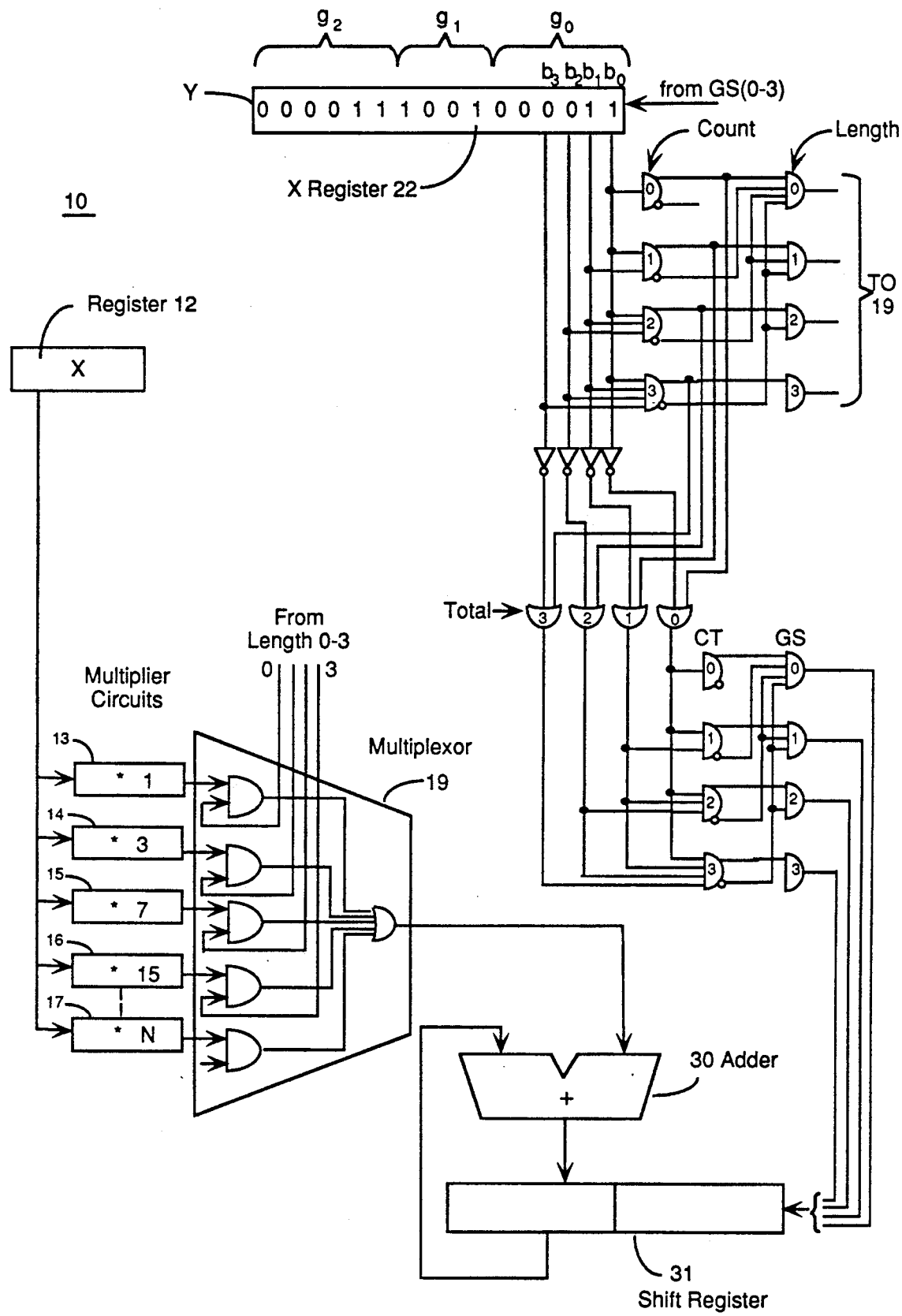
FIG. 1 is a block diagram illustrating a circuit constructed in accordance with the invention.

Referring now to FIG. 1, there is shown a block diagram of a circuit 10 in accordance with the invention for providing rapid multiplication of two binary numbers. A first binary number Y is placed in a first register 22. A second binary number X is placed in a second register 12.

The value in the register 12 is multiplied by a number of constants in a set of multiplier circuits 13-17 each of which is adapted to multiply the value X by a binary constant having contiguous one bits in the lower order bits and contiguous zero bits in the remaining higher order bits. For example, the multiplier circuit 13 multiplies the value X by the binary constant 0000000000000001. The multiplier circuit 14 multiplies the value X by the binary constant 0000000000000011. The multiplier circuit 15 multiplies the value X by the binary constant 0000000000000111. The multiplier circuit 16 and greater in like manner compute values of X multiplied by similar binary constants. The number of multiplier circuits 13-17 required will be discussed later. The result of each of these operations may be latched by the multiplier circuits 13-17 and held at the input to a multiplexor 19.

The actual multiplication may be accomplished by the multiplier circuits 13-17 quite simply by adding the value X to the high order bits of an accumulator, then shifting the partial product right one bit. This adding to the accumulator the value of X and shifting the partial product continues for each additional one in the binary constant. After all the adding and shifting, the partial product is further shifted to the right, by a number of bits equaling the number of contiguous zero bits in the remaining higher order bits of the binary constant, to obtain the final product. Alternatively, the multiplication may be accomplished by shifting the result produced by the next lower multiplier circuit left one bit to double its value and add to it the value of X. Combinations of these arrangements will occur to those skilled in the art which make most advantageous use of the circuitry available.

Using these outputs from the multiplier circuits 13-17, the circuit of the present invention 10 generates the partial products for the first binary number Y. This may be better understood by viewing the number 0000111001000011 in a register 22 arranged with its lowest order bit to the right as shown in the figure. Beginning with the lowest order bit, the first value encountered is a one. Next to the left is another contiguous one followed by four contiguous zeroes. Next to the left is a single one followed by two contiguous zeroes. Finally, to the left are three contiguous ones followed by four contiguous zeroes. It will be noticed that these groups begin with a one (where a one is available), then take in all contiguous ones to the left, and end after all contiguous zeroes to the left of the ones have been included. The groups g0-g2 are illustrated above the register 22 for the value described above for Y.

It will be recognized that all binary numbers consist of one or more ordered groups of bits of varying number of ones and zeros as described, where the one bits are all contiguous in the lower order bits and the zero bits are all contiguous in the higher order bits. It will be understood that the binary number 1111111111111111 has one such group with 16 contiguous one bits in the lower order bits and zero contiguous zero bits in the higher order bits, whereas the binary number 0000000000000000 has one such group with zero contiguous one bits in the lower order bits and 16 contiguous zero bits in the higher order bits. The numbers of ones in each of the individual groups are represented by the values of the binary constants used in the individual multiplier circuits 13-17. Consequently, the multiplication of the value X by the value Y may be accomplished by determining the number of contiguous ones and zeroes for each group as described, starting with the lowest ordered group of the value of Y, selecting a precomputed value of X multiplied by a binary constant consisting of the same number of contiguous ones in the group, adding that value to the high order bits of a shift register, shifting that partial products to the right by the number of zeroes and ones (the size of the group) in the group, selecting a second precomputed value of X multiplied by a binary constant consisting of the same number of contiguous ones in the second group, adding that value to the high order bits of the partial product in the shift register, shifting that partial product to the right by the number of zeroes and ones in the second group, and continuing in that manner until the above select, add and shift operations have been performed for each group.

An arrangement for virtually accomplishing the select, add and shift operations for each group of the number Y, using fixed length subsets of the groups, is illustrated in FIG. 1. Although it might be desired in a particular circuit to use larger fixed length subsets (e.g., eight bits at once), the details of such a circuit become exceedingly cumbersome. Consequently, a circuit capable of handling a fixed length subset of only four bits at a time is illustrated in FIG. 1. However, the logical equations detailing a circuit for handling a fixed length subset of eight bits at a time are included as Appendix A to this specification.

The circuit in FIG. 1 handles the bits in the Y register 22 four at a time. After a first with a fixed length subset of four bits bits have been handled, the remaining bits in the Y register are shifted to the right by a number of bit positions determined in the operation, and the next fixed length subset of four bits is handled. The bit positions of the Y register are designated b[31 . . . 0] beginning with the lowest order bit to the right and proceeding to the left. Thus, the lowest four bits are designated bits b[3 . . . 0]. The values of the bits in these positions are transferred to four AND gates COUNT 0-3. The value of the bit in position b[0] is transferred to each of the AND gates COUNT 0-3. The value of the bit in position b[1] is transferred to each of the AND gates COUNT 1-3. The value of the bit in position b[2] is transferred to each of the AND gates COUNT 2-3. The value of the bit in position b[3] is transferred to only AND gate COUNT 3.

Each of the AND gates COUNT 0-3 has both normal (non-inverted) and inverted output terminals. Since each of the AND gates COUNT 0-3 will produce a one at its non-inverted output only when it receives all one input values, the AND gate COUNT 0 will produce a one at its non-inverted output when the value of the bit in position b0 is a one, the AND gate COUNT 1 will produce a one at its non-inverted output when the value of the bits in positions b0 and b1 are both ones, the AND gate COUNT 2 will produce a one at its non-inverted output when the value of the bits in positions b0, b1 and b2 are all ones, and the AND gate COUNT 3 will produce a one at its non-inverted output when the value of the bits in positions b0, b1, b2 and b3 are all ones. Thus, using the first four bits (0011) illustrated in the Y register 22, the AND gates COUNT 0-1 will produce ones at their non-inverted output terminals while the AND gates COUNT 2-3 will produce zeros at their non-inverted output terminals. The overall result is that the AND gate COUNT 0-3 in the same position as the bit of the register 22 holding the highest order one will produce a one and all lower numbered AND gates COUNT 0-3 will also produce ones.

Each of the gates COUNT 0-3 also produces an inverted output. The values at the non-inverted and inverted output terminals of the gates COUNT 0-3 are selectively furnished to a second set of AND gates LENGTH 0-3. The gate LENGTH 0 receives the non-inverted output of the gate COUNT 0 and the inverted outputs from the gates COUNT 1-3. Thus, the gate LENGTH 0 is enabled only when the gate COUNT 0 provides a one and the other gates COUNT 1-3 provide zeroes at their non-inverted output terminals. The gate LENGTH 1 receives the non-inverted output of the gate COUNT 1 and the inverted outputs from the gates COUNT 2-3. Consequently, the gate LENGTH 1 is enabled only when the gate COUNT 1 provides a one and the other gates COUNT 2-3 provide zeroes at their non-inverted output terminals. The gate LENGTH 2 receives the non-inverted output of the gate COUNT 2 and the inverted output from the gate COUNT 3. The gate LENGTH 3 receives the non-inverted output of the gate COUNT 3 only. Thus, the gates LENGTH 0-3 produce an output only on the single one of the gates LENGTH 0-3 which indicates the length of the string of contiguous ones in the fixed length subset. With number 0011, only the gate LENGTH 1 produces a one output.

Thus the number of contiguous ones in a first group of g0 is determined at the output of the gates LENGTH 0-3 and is used to control the selection by the multiplexor 19 of the precomputed value furnished by the multiplier circuits 13-17. The number of multiplier circuits 13-17 required is a function of the size of the fixed length subset used by the circuit. In the exemplary circuit 10 illustrated in FIG. 1, since a fixed length subset of four bits is used, only four multiplier circuits 13-16 is required. Using the number Y illustrated, the number 0011 (decimal 3) enables the transfer of the value furnished at the multiplier circuit 14 by the multiplexor 19. This value is furnished by the multiplexor 19 to an adder circuit 30 constructed in a manner well known to the prior art. The value transferred to the adder 30 by the multiplexor 19 is added to the high order bits of any partial product previously in a shift register 31 (none at this time).

In order to count the total of zeros and ones provided in the four bit subset, each of the bits b[3 . . . 0] is inverted and transferred to one of four OR gates TOTAL 0-3. The non-inverted outputs of the AND gates COUNT 0-3 are also transferred one each to the four OR gates TOTAL 0-3. Since the gates COUNT 0-3 produce a one only when all bit positions connected as input hold ones and when any gate COUNT 0-3 produces a one output so do all lower numbered gates COUNT 0-3, the OR gates TOTAL 0-3 produce one outputs for each bit position b[3 . . . 0] starting with the first one, continuing through all of the contiguous ones, and finally continuing through the zeros contiguous to the highest order contiguous one. With the values (0011) illustrated in the positions b[3 . . . 0], each of the OR gates TOTAL 0-3 produces a one output.

In order to total the ones and zeroes in a fixed length subset, the outputs of the OR gates TOTAL 0-3 are fed to four AND gates CT 0-3. These gates produce a one output only when all of the values from the gates TOTAL 0-3 fed to them are ones. Thus, the result is that the non-inverted output of the gates CT 0-3 is one at the gate CT 0-3 which reflects the highest zero in positions b[3 . . . 0] starting with the first one and continuing through all of the contiguous ones and zeros. The lower numbered gates CT 0-3 also output ones. Thus, these gates CT 0-3 function in an analogous manner to the gates COUNT 0-3 except that they produce one output values on all non-inverted outputs of gates CT 0-3 which represent both contiguous ones and contiguous zeros. With the values (0011) illustrated in the positions b[3 . . . 0] of the Y register, each of the gates CT 0-3 provides a one output.

Each of the gates CT 0-3 also produces an inverted output. The values at the non-inverted and inverted output terminals of the gates CT 0-3 are selectively furnished to a set of AND gates GS 0-3 which provide a one output only at the gate GS 0-3 which indicates the number of contiguous ones and contiguous zeros counted. The gate GS 0 receives the non-inverted output of the gate CT 0 and the inverted outputs from the gates CT 1-3. Thus, the gate GS 0 is enabled only when the gate CT 0 provides a one and the other gates CT 1-3 provide zeroes. The gate GS 1 receives the non-inverted output of the gate CT 1 and the inverted outputs from the gates CT 2-3. Consequently, the gate GS 1 is enabled only when the gate CT 1 provides a one and the other gates CT 2-3 provide zeroes. The gate GS 2 receives the non-inverted output of the gate CT 2 and the inverted output from the gate CT 3. The gate GS 3 receives the non-inverted output of the gate CT 3 only. Thus, the gates GS 0-3 produce an output only on the single gate GS 0-3 which indicates the length of the total string of contiguous ones and zeros in the lower order bits of the fixed length subset. This value is furnished to the shift register 31 to shift the value of the partial product therein after each precomputed binary constant has been added. With the value 0011, the gate GS 3 produces a one indicating a shift of four bit positions of the partial product in the shift register 31.

This value at the output of the gates GS 0-3 is also used to shift the groups and the number in a Y register by the number of bit positions. Since the first four positions of the group g0 were counted on the first iteration, the number is shifted right by four bit positions so that the new number in the positions b[3 . . . 0] is (0100). When this number is provided to the AND gates COUNT 0-3, the non-inverted output terminals of those gates all produce zeros. These values along with the values at the inverted output terminals of the AND gates COUNT 0-3 are furnished to the AND gates LENGTH 0-3 to produce zero outputs at all of the output terminals of the AND gates LENGTH 0-3. This value is transferred to the multiplexor 19 so that no precomputed multiple of the number X is used in the second iteration. Consequently, the high order bits of the partial product in the shift register 31 is merely returned to the shift register 31 by the adder 30.

When, however, the number 0100 is inverted and furnished to the OR gates TOTAL 0-3, one outputs are produced at the terminals of OR gate TOTAL 0, OR gate TOTAL 1, and OR gate TOTAL 3. When these values are fed to the four AND gates CT 0-3, one values are produced at the non-inverted terminals of the AND gates CT 0-1. These values then cause the AND gates GS 0-3 to produce a one output only at the AND gate GS 1. This value is furnished to the shift register 31 to cause the partial product to be shifted two bit positions to the right. This completes the operation for the first group of bits in the group g0.

As before, the value at the output of the gates GS 0-3 is also used to shift the number in the Y register 22 to the right by the number of bit positions in the fixed length subset counted. Since two positions in the second fixed length subset were counted on the second iteration, the number is shifted by two bit positions so that the new number in the positions is (1001). From this point, the operation proceeds in a similar manner to virtually compute the partial products based on the numbers of ones and the total of ones and zeros in each of the remaining groups until the entire number Y is traversed and the final product is computed.

More particularly, as the first bit of group g2 and three bits of group g1 is handled, the AND gates TOTAL 0-3 indicate a single one which causes the multiplexor 19 to transfer the value furnished by the multiplier circuit 13 to the adder 30. The adder 30 also receives the partial product in the shift register 31. The adder adds the value received from multiplier circuit 13 to the high order bits of the partial product received from the shift register 31 and transfers the result to the shift register 31. The AND gates GS 0-3 indicate that there are a total of three contiguous ones and zeroes in the lower order bits of the fixed length subset. This value is used to shift the partial product in the shift register to the right by three bit positions.

The value is also used to shift the value in the Y register to the right by three bit positions so that the number 0111 resides in bits b[3 . . . 0]. These bits cause the AND gates TOTAL 0-3 to indicate three contiguous ones and cause the multiplexor 19 to transfer the value furnished by the multiplier circuit 15 to the adder 30. The adder 30 also receives the partial product in the shift register 31. The adder 30 adds the value received from multipler circuit 15 to the high order bits of the partial product received from the register 31 and transfers the result to the shift register 31. The AND gates 40 GS 0-3 indicate that there are a total of four contiguous ones and zeroes in the fixed length subset. This value is used to shift the partial product in the shift register to the right by four bit positions.

The operation continues in a similar manner with the remainder of the group g2 to provide the final product.

Since all of the add and shift operations typical to a binary multiplication are not necessary using the present invention, the multiplication process may be carried out substantially faster than in prior art multipliers.

Figure 2:
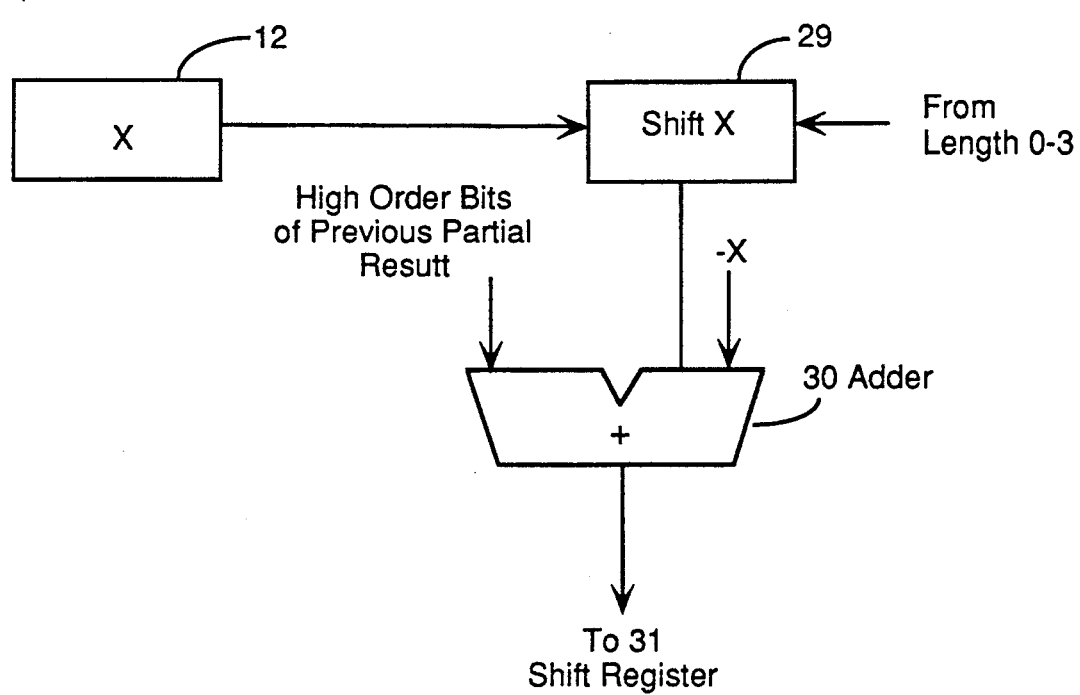
FIG. 2 is a block diagram illustrating a modification to the circuit of FIG. 1.

FIG. 2 illustrates a modification of the arrangement illustrated in FIG. 1 for carrying out the invention. In FIG. 2, the multiplier circuits 13-17 are removed so that a precomputation is not required. Instead a shift register 35 is provided for shifting the value of X for each fixed length subset by a number of bits equaling the number of contiguous one bits in the lower order bits of the fixed length subset, and transferring this shifted value to the adder along with the value of X and the partial product (if any) previously computed. Thus, multiplication by three requires that the X value be shifted to the right by two and the value of X subtracted. Multiplication by seven requires that the X value be shifted to the right by three bits and the value of X subtracted. Multiplication by fifteen requires that the X value be shifted to the right by four bits and the value of X subtracted. These values may be provided directly from the output from the AND gates TOTAL 0-3. The shift register 35 merely replaces the multiplier circuits 13-17 and the multiplexor 19 at the input to the adder 30.

Although the present invention has been described in terms of a preferred embodiment, it will be appreciated that various modifications and alterations might be made by those skilled in the art without departing from the spirit and scope of the invention. The invention should therefore be measured in terms of the claims which follow.

APPENDIX A

Group bits are: b[7..0]

Count ones are: co[7..0]

Where:

$co[0] = b[0]$ $co[1] = b[0] \ \& \ b[1]$ $co[2] = b[0] \ \& \ b[1] \ \& \ b[2]$ $co[3] = b[0] \ \& \ b[1] \ \& \ b[2] \ \& \ b[3]$ $co[4] = b[0] \ \& \ b[1] \ \& \ b[2] \ \& \ b[3] \ \& \ b[4]$ $co[5] = b[0] \ \& \ b[1] \ \& \ b[2] \ \& \ b[3] \ \& \ b[4] \ \& \ b[5]$ $co[6] = b[0] \ \& \ b[1] \ \& \ b[2] \ \& \ b[3] \ \& \ b[4] \ \& \ b[5] \ \& \ b[6]$ $co[7] = b[0] \ \& \ b[1] \ \& \ b[2] \ \& \ b[3] \ \& \ b[4] \ \& \ b[5] \ \& \ b[6] \ \& \ b[7]$

Ones Length is: ol[7..0]

$ol[0] = co[0] \ \& \ co[1] \ \& \ co[2] \ \& \ co[3] \ \& \ co[4] \ \& \ co[5] \ \& \ co[6] \ \& \ co[7]$ $ol[1] = co[1] \ \& \ co[2] \ \& \ co[3] \ \& \ co[4] \ \& \ co[5] \ \& \ co[6] \ \& \ co[7]$ $ol[2] = co[2] \ \& \ co[3] \ \& \ co[4] \ \& \ co[5] \ \& \ co[6] \ \& \ co[7]$ $ol[3] = co[3] \ \& \ co[4] \ \& \ co[5] \ \& \ co[6] \ \& \ co[7]$ $ol[4] = co[4] \ \& \ co[5] \ \& \ co[6] \ \& \ co[7]$ $ol[5] = co[5] \ \& \ co[6] \ \& \ co[7]$ $ol[6] = co[6] \ \& \ co[7]$ $ol[7] = co[7]$

In general, $ol[n] = co[n]$, $ol[i] = co[i] \ \& \ co[n] \ \& \ co[n-1] \ \& \ \ldots \ co[i+1]$, where $i = 0, \ldots, n-1$.

Totals are: tz[7..0]

$t[0] = co[0] \ | \ b[0]$ $t[1] = co[1] \ | \ b[1]$ $t[2] = co[2] \ | \ b[2]$ $t[3] = co[3] \ | \ b[3]$ $t[4] = co[4] \ | \ b[4]$ $t[5] = co[5] \ | \ b[5]$ $t[6] = co[6] \ | \ b[6]$ $t[7] = co[7] \ | \ b[7]$

In general, $t[i] = co[i] \ | \ b[i]$ where $i = 0, \ldots, n$.

Count totals are: ct[7..0]

-continued ct[0] = t[0]

ct[1] = t[0] & t[1]

ct[2] = t[0] & t[1] & t[2]

ct[3] = t[0] & t[1] & t[2] & t[3]

ct[4] = t[0] & t[1] & t[2] & t[3] & t[4]

ct[5] = t[0] & t[1] & t[2] & t[3] & t[4] & t[5]

ct[6] = t[0] & t[1] & t[2] & t[3] & t[4] & t[5] & t[6]

ct[7] = t[0] & t[1] & t[2] & t[3] & t[4] & t[5] & t[6] & t[7]

In general, ct[i] = t[0] & t[1] & ... t[i] where i = 1, ... n.

Group Size is: gs[7..0]

gs[0] = ct[0] & ct[1] & ct[2] & ct[3] & ct[4] & ct[5] & ct[6] & ct[7]

gs[1] = ct[1] & ct[2] & ct[3] & ct[4] & ct[5] & ct[6] & ct[7]

gs[2] = ct[2] & ct[3] & ct[4] & ct[5] & ct[6] & ct[7]

gs[3] = ct[3] & ct[4] & ct[5] & ct[6] & ct[7]

gs[4] = ct[4] & ct[5] & ct[6] & ct[7]

gs[5] = ct[5] & ct[6] & ct[7]

gs[6] = ct[6] & ct[7]

gs[7] = ct[7]

In general, gs[n] = ct[n], gs[i] = ct[i] & ct[n] & ct[n−1] & ... ct[i+1] where i = 1, ... n−1. where
‾ means NOT
| means OR
& means AND
n+1 means the size of the fixed length subsets

What is claimed is:

1. A circuit for multiplying a first and a second binary number, said first and second binary numbers comprising of one or more ordered groups of ordered bits, each of said bits having a value of one or zero, bits having a value of one being located contiguously in the lower order bits of said groups, and bits having a value of zero being located in the remaining higher order bits of said groups, said circuit comprising:
   (a) a first and a second register means for holding said first and second binary numbers;
   (b) generating means coupled to said first and second register means for generating a partial product for each of said ordered groups of said first binary number, each of said partial products being equal to said second binary number multiplied by one of said ordered groups; and
   (c) accumulating means coupled to said generating means for accumulating each of said generated partial products, the product of the first and second binary numbers being equal to the accumulation of the partial products.

2. The circuit for multiplying a first and a second binary number as set forth in claim 1 wherein said generating means for generating said partial products for said ordered groups of said first binary number, generates said partial products, starting with the lowest ordered group, moving towards the higher ordered groups, until the entire first binary number is traversed.

3. The circuit for multiplying a first and a second binary number as set forth in claim 2 wherein said means for virtually generating said partial products for said ordered groups of said first binary number, comprises:
   (a) means coupled to said first register means for determining, for fixed length subsets of said first binary number, the number of contiguous one bits, starting with the lowest order bit, and the number of contiguous zero bits immediately following said contiguous one bits, in each of said fixed length subsets,
   said determining means determines said numbers of contiguous one bits and contiguous zero bits, starting with the lowest ordered fixed length subset of said first binary number, moving towards the higher ordered fixed length subsets of said first binary number, until said first binary number is traversed, and offsetting each successive fixed length subset from the previous fixed length subset by a varying number of bits,
   said varying number of bits offset each time, equals said number of contiguous one bits and contiguous zero bits determined for said previous fixed length subset; and
   (b) computing means coupled to said second register means and said determining means for computing a multiple of said second binary number, for each of said fixed length subsets, as said numbers of contiguous one bits and contiguous zero bits for each of said fixed length subsets are determined, and outputting said computed multiples to said accumulating means coupled to said computing means,
   each of said multiples being computed equals said second binary number multiplied by a binary constant consisting of the same number of contiguous one bits in the lower order bits, as said number of contiguous one bits determined for each of said fixed length subsets, and contiguous zero bits in the remaining higher order bits.

4. The circuit for multiplying a first and a second binary number as set forth in claim 3 wherein said determining means comprises a first and a second set of AND gates, said first and second second sets of AND coupled to to said first register means and to each other in a manner such that, said first set of AND gates receives each of said fixed length subsets from said first register means as input, and said second set of AND gates produce a plurality of output signals, indicating said number of contiguous one bits in said lower order bits of each of said fixed length subsets.

5. The circuit for multiplying a first and a second binary number as set forth in claim 3 wherein said first and second sets of AND gates are coupled to each other and to said first register means as follows:

$$CO[i] = b[i] \& b[i-1] \& \ldots b[0]$$
for $i = 1, \ldots, n$
$$OL[n] = CO[n]$$
$$OL[i] = CO[i] \& \overline{CO[n]} \& \overline{CO[n-1]} \& \ldots \overline{CO[i+1]}$$
for $i = 1 \ldots, n-1$ where $n+1$ is the number of bits in each of said fixed length subsets, b[i] is the ith bit of each of said fixed length subsets, CO[i] is the ith AND gate of said first set of AND gates, and OL[i] is the ith AND gate of said second set of AND gates, ¯ means NOT, and & means AND.

6. The circuit for multiplying a first and a second binary number as set forth in claim 4 wherein said determining means further comprises a set of OR gates, a third and fourth set of AND gates, said sets of OR gates and AND gates are coupled to each other and said first register means in a manner such that, said set of OR gates receives each of said fixed length subsets from said first register means as input, and said fourth set of AND gates produce a plurality of output signals, indicating said number of bits to be offset by each successive fixed length subset from the previous fixed length subset.

7. The circuit for multiplying a first and a second binary number as set forth in claim 6 wherein said sets of OR gates and AND gates are coupled to each other and to said first register means as follows:

$$CO[i] = b[i] \& b[i-1] \& \ldots b[0]$$
for $i = 0, \ldots, n$
$$OL[n] = CO[n]$$
$$OL[i] = CO[i] \& \overline{CO[n]} \& \overline{CO[n-1]} \& \ldots \overline{CO[i+1]}$$
for $i = 0 \ldots, n-1$
$$T[i] = CO[i] | b[i]$$
$$CT[i] = T[0] \& T[1] \& \ldots T[i]$$
for $i = 0, \ldots, n$
$$GS[n] = CT[n]$$
$$GS[i] = CT[i] \& \overline{CT[n]} \& \overline{CT[n-1]} \& \ldots \overline{CT[i+1]}$$
for $i = 0, \ldots, n-1$ where $n+1$ is the number of bits in each of said fixed length subsets, b[i] is the ith bit of each of said fixed length subsets, CO[i] is the ith AND gate of said first set of AND gates, and OL[i] is the ith AND gate of said second set of AND gates, T[i] is the ith OR gate of said set of OR gates, CT[i] is the ith AND gate of said third set of AND gates, GS[i] is the ith AND gate of said fourth set of AND gates, ¯ means NOT,

| means OR, and

& means AND.

8. The circuit for multiplying a first and a second binary number as set forth in claim 3 wherein said computing means for computing said multiples of said second binary number, for said fixed length subsets of said first binary number, comprises:

(a) pre-computing means coupled to said second register means for pre-computing a set of ordered multiples for said second binary number, said ordered multiples being equal to said second binary number multiplied by a set of ordered binary constants consisting of increasing number of contiguous one bits in the lower order bits, starting with one contiguous one bit, and contiguous zero bits in the remaining higher order bits; and (b) selecting means coupled to said pre-computing means and said determining means for selecting one of said pre-computed ordered multiples, for each of said fixed length subsets, and outputting each of said selected multiples to said accumulating means coupled to said selecting means, each of said multiples is selected in accordance to said number of contiguous one bits determined for each of said fixed length subsets.

9. The circuit for multiplying a first and a second binary number as set forth in claim 8 wherein said pre-computing means for pre-computing said ordered multiples for said second binary number, comprises:

(a) a first set of register means for holding said set of ordered binary constants;

(b) a second set of corresponding register means for holding intermediate and final results of said computations; and (c) adding means coupled to said second register means and said first set of register means for adding said second binary number into each register means of said second set of register means coupled to said adding means, said addition being repeated, for each of said register means of said second set of register means, a number of times equaling the number of contiguous one bits in said corresponding binary constants.

10. The circuit for multiplying a first and a second binary number as set forth in claim 8 wherein said pre-computing means for pre-computing said ordered multiples for said second binary number comprises:

(a) a first set of register means for holding intermediate and final results of said computations;

(b) a first adding means coupled to said second register means for adding said second binary number into a first register means of said first set of register means coupled to said first adding means; and (c) a second adding means coupled to said second register means and said first set of register means for adding the content of said first register means of said first set of register means into a second register means of said first set of register means, shifting the content of said second register means of said first set of register means towards the higher order bits by one bit, and adding said second binary number into said second register means of said first set of register means, said adding, shifting and adding are being repeated for each successive pair of register means of said first set of register means, starting with said second register means and a third register means of said first set of register means, until said adding, shifting and adding are performed for a next to last register means and a last register means of said first set of register means.

11. The circuit for multiplying a first and a second binary number as set forth in claim 3 wherein said computing means for computing said multiples of said second binary number, for said fixed length subsets of said first binary number, comprises:
- (a) a third register means for holding intermediate and final results of said computation;
- (b) adding means coupled to said second register means for adding said second binary number, once, into said third register means coupled to said adding means;
- (c) shifting means coupled to said third register means and said determining means for shifting the content of said third register means, after said addition, towards the higher order bits, by a number of bits equaling the total number of said contiguous one bits determined for said fixed length subsets of said first binary number; and
- (d) subtracting means coupled to said second register means and said third register means for substracting said second binary number, once, after said shifting, from the content of said third register means, and outputting the content of said third register means, after said subtraction, to said accumulating means coupled to said third register means.

12. The circuit for multiplying a first and a second binary number as set forth in claim 3 wherein said accumulating means for accumulating said computed multiples for said fixed length subsets of said first binary number, comprises:
- (a) a third register means for holding intermediate and final results of said accumulation;
- (b) adding means coupled to said computing means for adding each of said multiples outputted by said computing means into the high order bits of said third register means coupled to said adding means; and
- (c) shifting means coupled to said third register means and said determining means for shifting the content of said third register means, towards the lower order bits, after each of said addition, by a number of bits equaling the total number of said contiguous one bits and said contiguous zero bits determined for said fixed length subsets of said first binary number.

13. A circuit for multiplying a first and a second binary number comprising:
- (a) a first and a second register means for holding said first and said second binary numbers;
- (b) means coupled to said first register means for determining, for fixed length subsets of said first binary number, the number of contiguous one bits, starting with the lowest order bit, and the number of contiguous zero bits immediately following said contiguous one bits, in each of said fixed length subsets,
  said determining means determines said numbers of contiguous one bits and contiguous zero bits, starting with the lowest ordered fixed length subset of said first binary number, moving towards the higher ordered fixed length subsets of said first binary number, until said first binary number is traversed, and offsetting each successive fixed length subset from the previous fixed length subset by a varying number of bits,
  said varying number of bits offset each time, equals said number of contiguous one bits and contiguous zero bits determined for said previous fixed length subset; and
- (c) computing means coupled to said second register means and said determining means for computing a multiple of said second binary number, for each of said fixed length subsets, as said number of contiguous one bits for each of said fixed length subsets is determined,
  each of said multiples being computed equals said second binary number multiplied by a binary constant consisting of the same number of contiguous one bits in the lower order bits, as said number of contiguous one bits determined for each of said fixed length subsets, and contiguous zero bits in the remaining higher order bits; and
- (d) accumulating means coupled to said computing means and said determining means for accumulating each of said computed multiples of said second binary number for said fixed length subsets of said first binary number.

14. The circuit for multiplying a first and a second binary number as set forth in claim 13 wherein said determining means determines said number of contiguous one bits and contiguous zero bits for fixed length subsets of said first binary number having a length of eight bits.

15. The circuit for multiplying a first and a second binary number as set forth in claim 14 wherein said determining means comprises a first and a second set of eight AND gates, said first and second second sets of eight AND gates are coupled to to said first register means and to each other in a manner such that, said first set of eight AND gates receives each of said fixed length subsets of eight bits from said first register means as input, and said second set of eight AND gates produce a plurality of output signals, indicating said number of contiguous one bits in said lower order bits of each of said fixed length subsets of eight bits.

16. The circuit for multiplying a first and a second binary number as set forth in claim 15 wherein said first and second sets of eight AND gates are coupled to each other and to said first register means as follows:

$$CO[i] = b[i] \;\&\; b[i-1] \;\&\; \ldots b[0]$$
for $i = 1, \ldots, 7$
$$OL[7] = \overline{CO[7]}$$
$$OL[i] = CO[i] \;\&\; \overline{CO[7]} \;\&\; \overline{CO[6]} \;\&\; \ldots \overline{CO[i+1]}$$
for $i = 1 \ldots, 6$ where $b[i]$ is the ith bit of each of said fixed length subsets of eight bits,
  $CO[i]$ is the ith AND gate of said first set of eight AND gates, and
  $OL[i]$ is the ith AND gate of said second set of eight AND gates,
  ‾ means NOT, and
  & means AND.

17. The circuit for multiplying a first and a second binary number as set forth in claim 15 wherein said determining means further comprises a set of eight OR gates, a third and fourth set of eight AND gates, said set of eight OR gates and said sets of eight AND gates are coupled to each other and said first register means in a manner such that, said set of eight OR gates receives each of said fixed length subsets of eight bits from said first register means as input, and said fourth set of eight AND gates produce a plurality of output signals, indicating said number of bits to be offset by each successive fixed length subset of eight bits from the previous fixed length subset of eight bits.

18. The circuit for multiplying a first and a second binary number as set forth in claim 17 wherein said sets of eight OR gates and eight AND gates are coupled to each other and to said first register means as follows:

$$CO[i] = b[i] \,\&\, b[i-1] \,\&\, \ldots b[0]$$
for $i = 0, \ldots, 7$
$$OL[7] = CO[7]$$
$$OL[i] = CO[i] \,\&\, CO[7] \,\&\, CO[6] \,\&\, \ldots CO[i+1]$$
for $i = 0 \ldots, 6$
$$T[i] = CO[i] \,|\, b[i]$$
$$CT[i] = T[0] \,\&\, T[1] \,\&\, \ldots T[i]$$
for $i = 0, \ldots, 7$
$$GS[7] = CT[7]$$
$$GS[i] = CT[i] \,\&\, CT[7] \,\&\, CT[6] \,\&\, \ldots CT[i+1]$$
for $i = 0, \ldots, 6$ where b[i] is the ith bit of each of said fixed length subsets of eight bits,
  CO[i] is the ith AND gate of said first set of eight AND gates, and
  OL[i] is the ith AND gate of said second set of eight AND gates,
  T[i] is the ith OR gate of said set of eight OR gates,
  CT[i] is the ith AND gate of said third set of eight AND gates,
  GS[i] is the ith AND gate of said fourth set of eight AND gates,
  means NOT,
  | means OR, and
  & means AND.

19. The circuit for multiplying a first and a second binary number as set forth in claim 13 wherein said determining means determines said number of contiguous one bits and contiguous zero bits for fixed length subsets of said first binary number having a length of four bits.

20. The circuit for multiplying a first and a second binary number as set forth in claim 19 wherein said determining means comprises a first and a second set of four AND gates, said first and second second sets of four AND gates are coupled to to said first register means and to each other in a manner such that, said first set of four AND gates receives each of said fixed length subsets of four bits from said first register means as input, and said second set of four AND gates produce a plurality of output signals, indicating said number of contiguous one bits in said lower order bits of each of said fixed length subsets of four bits.

21. The circuit for multiplying a first and a second binary number as set forth in claim 20 wherein said first and second sets of four AND gates are coupled to each other and to said first register means as follows:

$$CO[i] = b[i] \,\&\, b[i-1] \,\&\, \ldots b[0]$$
for $i = 1, \ldots, 3$
$$OL[3] = CO[3]$$
$$OL[i] = CO[i] \,\&\, CO[3] \,\&\, CO[2] \,\&\, \ldots CO[i+1]$$
for $i = 1 \ldots, 2$ where b[i] is the ith bit of each of said fixed length subsets of four bits,
  CO[i] is the ith AND gate of said first set of four AND gates, and
  OL[i] is the ith AND gate of said second set of four AND gates,
  means NOT, and
  & means AND.

22. The circuit for multiplying a first and a second binary number as set forth in claim 20 wherein said determining means further comprises a set of four OR gates, a third and fourth set of four AND gates, said set of four OR gates and said sets of four AND gates are coupled to each other and said first register means in a manner such that, said set of four OR gates receives each of said fixed length subsets of four bits from said first register means as input, and said fourth set of four AND gates produce a plurality of output signals, indicating said number of bits to be offset by each successive fixed length subset of four bits from the previous fixed length subset of four bits.

23. The circuit for multiplying a first and a second binary number as set forth in claim 22 wherein said sets of four OR gates and four AND gates are coupled to each other and to said first register means as follows:

$$CO[i] = b[i] \,\&\, b[i-1] \,\&\, \ldots b[0]$$
for $i = 0, \ldots, 3$
$$OL[3] = CO[3]$$
$$OL[i] = CO[i] \,\&\, CO[3] \,\&\, CO[2] \,\&\, \ldots CO[i+1]$$
for $i = 0 \ldots, 2$
$$T[i] = CO[i] \,|\, b[i]$$
$$CT[i] = T[0] \,\&\, T[1] \,\&\, \ldots T[i]$$
for $i = 0, \ldots, 3$
$$GS[3] = CT[3]$$
$$GS[i] = CT[i] \,\&\, CT[3] \,\&\, CT[2] \,\&\, \ldots CT[i+1]$$
for $i = 0, \ldots, 2$ where b[i] is the ith bit of each of said fixed length subsets of four bits,
  CO[i] is the ith AND gate of said first set of four AND gates, and
  OL[i] is the ith AND gate of said second set of four AND gates,
  T[i] is the ith OR gate of said set of four OR gates,
  CT[i] is the ith AND gate of said third set of four AND gates,
  GS[i] is the ith AND gate of said fourth set of four AND gates,
  means NOT,
  | means OR, and
  & means AND.

24. The circuit for multiplying a first and a second binary number as set forth in claim 13 wherein said computing means for computing said multiples of said second binary number, for said fixed length subsets of said first binary number, comprises:
  (a) pre-computing means coupled to said second register means for pre-computing a set of ordered multiples for said second binary number, said ordered multiples being equal to said second binary number multiplied by a set of ordered binary constants consisting of increasing number of contiguous one bits in the lower order bits, starting with one contiguous one bit, and contiguous zero bits in the remaining higher order bits; and (b) selecting means coupled to said pre-computing means and said determining means for selecting one of said pre-computed ordered multiples, for each of said fixed length subsets, and outputting each of said selected multiples to said accumulating means coupled to said selecting means, each of said multiples is selected in accordance to said number of contiguous one bits determined for each of said fixed length subsets.

25. The circuit for multiplying a first and a second binary number as set forth in claim 24 wherein said pre-computing means for pre-computing said ordered multiples for said second binary number, comprises:

(a) a first set of eight register means for holding eight of said set of ordered binary constants;

(b) a second set of corresponding eight register means for holding eight intermediate and final results of said computations; and (c) adding means coupled to said second register means and said first set of register means for adding said second binary number into each register means of said second set of eight register means coupled to said adding means, said addition being repeated, for each of said register means of said second said of eight register means, a number of times equaling the number of contiguous one bits in said eight corresponding binary constants.

26. The circuit for multiplying a first and a second binary number as set forth in claim 24 wherein said pre-computing means for pre-computing said ordered multiples for said second binary number, comprises:

(a) a first set of four register means for holding four of said set of ordered binary constants;

(b) a second set of corresponding four register means for holding four intermediate and final results of said computations; and (c) adding means coupled to said second register means and said first set of register means for adding said second binary number into each register means of said second set of four register means coupled to said adding means, said addition being repeated, for each of said register means of said second said of four register means, a number of times equaling the number of contiguous one bits in said four corresponding binary constants.

27. The circuit for multiplying a first and a second binary number as set forth in claim 24 wherein said pre-computing means for pre-computing said ordered multiples for said second binary number comprises:

(a) a first set of eight register means for holding eight intermediate and final results of said computations;

(b) a first adding means coupled to said second register means for adding said second binary number into a first register means of said first set of eight register means coupled to said first adding means; and (c) a second adding means coupled to said second register means and said first set of register means for adding the content of said first register means of said first set of eight register means into a second register means of said first set of eight register means, shifting the content of said second register means of said first set of eight register means towards the higher order bits by one bit, and adding said second binary number into said second register means of said first set of eight register means, said adding, shifting and adding are being repeated for each successive pair of register means of said first set of eight register means, starting with said second register means and a third register means of said first set of eight register means, until said adding, shifting and adding are performed for a seventh register means and an eighth register means of said first set of eight register means.

28. The circuit for multiplying a first and a second binary number as set forth in claim 24 wherein said pre-computed means for pre-computing said ordered multiples for said second binary number comprises:

(a) a first set of four register means for holding four intermediate and final results of said computations;

(b) a first adding means coupled to said second register means for adding said second binary number into a first register means of said first set of four register means coupled to said first adding means; and (c) a second adding means coupled to said second register means and said first set of register means for adding the content of said first register means of said first set of four register means into a second register means of said first set of four register means, shifting the content of said second register means of said first set of four register means towards the higher order bits by one bit, and adding said second binary number into said second register means of said first set of four register means, said adding, shifting and adding are being repeated for each successive pair of register means of said first set of four register means, starting with said second register means and a third register means of said first set of four register means, then said third register means and a fourth register means of said first set of four register means.

29. The circuit for multiplying a first and a second binary number as set forth in claim 13 wherein said computing means for computing said multiples of said second binary number, for said fixed length subsets of said first binary number, comprises:

(a) a third register means for holding intermediate and final results of said computation;

(b) adding means coupled to said second register means for adding said second binary number, once, into said third register means coupled to said adding means;

(c) shifting means coupled to said third register means and said determining means for shifting the content of said third register means, after said addition, towards the higher order bits, by a number of bits equaling the total number of said contiguous one bits determined for said fixed length subsets of said first binary numbers; and (d) subtracting means coupled to said second register means and said third register means for subtracting said second binary number, once, after said shifting, from the content of said third register means, and outputting the content of said third register means, after said subtraction, to said accumulating means coupled to said third register means.

30. The circuit for multiplying a first and a second binary number as set forth in claim 13 wherein said accumulating means for accumulating said computed multiples for said fixed length subsets of said first binary number, comprises:
- (a) a third register means for holding intermediate and final results of said accumulation;
- (b) adding means coupled to said computing means for adding each of said multiples outputted by said computing means into the high order bits of said third register means coupled to said adding means; and
- (c) shifting means coupled to said third register means and said determining means for shifting the content of said third register means, towards the lower order bits, after each of said addition, by a number of bits equaling the total number of said contiguous one bits and said contiguous zero bits determined for said fixed length subsets of said first binary number.

31. A circuit for multiplying a first and a second binary number comprising:
- (a) a first and a second register means for holding said first and said second binary numbers;
- (b) means coupled to said first register means for determining, for four bits subsets of said first binary number, the number of contiguous one bits, starting with the lowest order bit, and the number of contiguous zero bits immediately following said contiguous one bits, in each of said four bits subsets, said determining means determines said numbers of contiguous one bits and contiguous zero bits, starting with the lowest ordered four bits subset of said first binary number, moving towards the higher ordered four bits subsets of said first binary number, until said first binary number is traversed, and offsetting each successive four bits subset from the previous four bits subset by a varying number of bits,
  said varying number of bits offset each time, equals said number of contiguous one bits and contiguous zero bits determined for said previous four bits subset; and
- (c) computing means coupled to said second register means and said determining means for computing a multiple of said second binary number, for each of said four bits subsets, as said number of contiguous one bits for each of said four bits subsets is determined,
  each of said multiples being computed equals said second binary number multiplied by a binary constant consisting of the same number of contiguous one bits in the lower order bits, as said number of contiguous one bits determined for each of said four bits subsets, and contiguous zero bits in the remaining higher order bits; and
- (d) accumulating means coupled to said computing means and said determining means for accumulating each of said computed multiples of said second binary number for said four bits subsets of said first binary number.

32. The circuit for multiplying a first and a second binary number as set forth in claim 31 wherein said determining means comprises a first and a second set of four AND gates, said first and second second sets of four AND gates are coupled to to said first register means and to each other in a manner such that, said first set of four AND gates receives each of said four bits subsets from said first register means as input, and said second set of four AND gates produce a plurality of output signals, indicating said number of contiguous one bits in said lower order bits of each of said four bits subsets.

33. The circuit for multiplying a first and a second binary number as set forth in claim 32 wherein said first and second sets of four AND gates are coupled to each other and to said first register means as follows:

$$CO[i] = b[i] \& b[i-1] \& \ldots b[0]$$
$$\text{for } i = 1, \ldots, 3$$
$$OL[3] = CO[3]$$
$$OL[i] = CO[i] \& \quad CO[3] \& \quad CO[2] \& \ldots \quad CO[i+1]$$
$$\text{for } i = 1 \ldots, 2$$

where $b[i]$ is the ith bit of each of said four bits subsets,
$CO[i]$ is the ith AND gate of said first set of four AND gates, and
$OL[i]$ is the ith AND gate of said second set of four AND gates,
means NOT, and
& means AND.

34. The circuit for multiplying a first and a second binary number as set forth in claim 32 wherein said determining means further comprises a set of four OR gates, a third and fourth set of four AND gates, said set of four OR gates and said sets of four AND gates are coupled to each other and said first register means in a manner such that, said set of four OR gates receives each of said four bits subsets from said first register means as input, and said fourth set of four AND gates produce a plurality of output signals, indicating said number of bits to be offset by each successive four bits subset from the previous four bits subset.

35. The circuit for multiplying a first and a second binary number as set forth in claim 34 wherein said sets of four OR gates and four AND gates are coupled to each other and to said first register means as follows:

$$CO[i] = b[i] \& b[i-1] \& \ldots b[0]$$
$$\text{for } i = 0, \ldots, 3$$
$$OL[3] = CO[3]$$
$$OL[i] = CO[i] \& \quad CO[3] \& \quad CO[2] \& \ldots \quad CO[i+1]$$
$$\text{for } i = 0 \ldots, 2$$
$$T[i] = CO[i] \mid b[i]$$
$$CT[i] = T[0] \& T[1] \& \ldots T[i]$$
$$\text{for } i = 0, \ldots, 3$$
$$GS[3] = CT[3]$$
$$GS[i] = CT[i] \& \quad CT[3] \& \quad CT[2] \& \ldots CT[i+1]$$
$$\text{for } i = 0, \ldots, 2$$

where $b[i]$ is the ith bit of each of said four bits subsets,
$CO[i]$ is the ith AND gate of said first set of four AND gates, and
$OL[i]$ is the ith AND gate of said second set of four AND gates,
$T[i]$ is the ith OR gate of said set of four OR gates,
$CT[i]$ is the ith AND gate of said third set of four AND gates,
$GS[i]$ is the ith AND gate of said fourth set of four AND gates,
means NOT,
| means OR, and
& means AND.

36. The circuit for multiplying a first and a second binary number as set forth in claim 31 wherein said computing means for computing said multiples of said second binary number, for said four bits subsets of said first binary number, comprises:
   (a) pre-computing means coupled to said second register means for pre-computing a set of ordered multiples for said second binary number, said ordered multiples being equal to said second binary number multiplied by a set of ordered binary constants consisting of increasing number of contiguous one bits in the lower order bits, starting with one contiguous one bit, and contiguous zero bits in the remaining higher order bits; and
   (b) selecting means coupled to said pre-computing means and said determining means for selecting one of said pre-computed ordered multiples, for each of said four bits subsets, and outputting each of said selected multiples to said accumulating means coupled to said selecting areas,
   each of said multiples is selected in accordance to said number of contiguous one bits determined for each of said four bits subsets.

37. The circuit for multiplying a first and a second binary number as set forth in claim 36 wherein said pre-computing means for pre-computing said ordered multiples for said second binary number, comprises:
   (a) a first set of four register means for holding four of said set of ordered binary constants;
   (b) a second set of corresponding four register means for holding four intermediate and final results of said computations; and
   (c) adding means coupled to said second register means and said first set of register means for adding said second binary number into each register means of said second set of four register means coupled to said adding means, said addition being repeated, for each of said register means of said second said of four register means, a number of times equaling the number of contiguous one bits in said four corresponding binary constants.

38. The circuit for multiplying a first and a second binary number as set forth in claim 36 wherein said pre-computing means for pre-computing said ordered multiples for said second binary number comprises:
   (a) a first set of four register means for holding four intermediate and final results of said computations;
   (b) a first adding means coupled to said second register means for adding said second binary number into a first register means of said first set of four register means coupled to said first adding means; and
   (c) a second adding means coupled to said second register means and said first set of register means for adding the content of said first register means of said first set of four register means into a second register means of said first set of four register means, shifting the content of said second register means of said first set of four register means towards the higher order bits by one bit, and adding said second binary number into said second register means of said first set of four register means,
   said adding, shifting and adding are being repeated for each successive pair of register means of said first set of four register means, starting with said second register means and a third register means of said first set of four register means, then said third register means and a fourth register means of said first set of four register means.

39. The circuit for multiplying a first and a second binary number as set forth in claim 31 wherein said computing means for computing said multiples of said second binary number, for said four bits subsets of said first binary number, comprises:
   (a) a third register means for holding intermediate and final results of said computation;
   (b) adding means coupled to said second register means for adding said second binary number, once, into said third register means coupled to said adding means;
   (c) shifting means coupled to said third register means and said determining means for shifting the content of said third register means, after said addition, towards the higher order bits, by a number of bits equaling the total number of said contiguous one bits determined for said four bits subsets of said first binary number; and
   (d) substracting means coupled to said second register means and said third register means for subtracting said second binary number, once, after said shifting, from the content of said third register means, and outputting the content of said third register means, after said subtraction, to said accumulating means coupled to said third register means.

40. The circuit for multiplying a first and a second binary number as set forth in claim 31 wherein said accumulating means for accumulating said computed multiples for said four bits subsets of said first binary number, comprises:
   (a) a third register means for holding intermediate and final results of said accumulation;
   (b) adding means coupled to said computing means for adding each of said multiples outputted by said computing means into the high order bits of said third register means coupled to said adding means; and
   (c) shifting means coupled to said third register means and said determining means for shifting the content of said third register means, towards the lower order bits, after each of said addition, by a number of bits equaling the total number of said contiguous one bits and said contiguous zero bits determined for said four bits subsets of said first binary number.

* * * * *

UNITED STATES PATENT AND TRADEMARK OFFICE
CERTIFICATE OF CORRECTION

PATENT NO. : 5,008,850

DATED : April 16, 1991

INVENTOR(S) : Eric Jensen

It is certified that error appears in the above-identified patent and that said Letters Patent is hereby corrected as shown below:

In Appendix A of the patent, the table centered between columns 7 and 8 should be replaced with:

Group bits are:        b[7..0]
<u>Count</u> ones are:       co[7..0]
Where:
co[0] = b[0]
co[1] = b[0] & b[1]
co[2] = b[0] & b[1 ] & b[2]
co[3] = b[0] & b[1] & b[2] & b[3]
co[4] = b[0] & b[1] & b[2] & b[3] & b[4]
co[5] = b[0] & b[1] & b[2] & b[3] & b[4] & b[5]
co[6] = b[0] & b[1] & b[2] & b[3] & b[4] & b[5] & b[6]
co[7] = b[0] & b[1] & b[2] & b[3] & b[4] & b[5] & b[6] & b[7]
In general, co[i] = b[i] & b[i-1] ... b[0], where i=0, ..., n

UNITED STATES PATENT AND TRADEMARK OFFICE
CERTIFICATE OF CORRECTION

PATENT NO. : 5,008,850
DATED : April 16, 1991
INVENTOR(S) : Eric Jensen

It is certified that error appears in the above-identified patent and that said Letters Patent is hereby corrected as shown below:

In Appendix A of the patent, the table centered between columns 7 and 8 should be replaced with:

```
Ones Length is:         OL[7. .0]
ol[0] = co[0] & ^co[1] & ^co[2] & ^co[3] & ^co[4] & ^co[5] & ^co[6] & ^co[7]
ol[1] = co[1] & ^co[2] & ^co[3] & ^co[4] & ^co[5] & ^co[6] & ^co[7]
ol[2] = co[2] & ^co[3] & ^co[4] & ^co[5] & ^co[6] & ^co[7]
ol[3] = co[3] & ^co[4] & ^co[5] & ^co[6] & ^co[7]
ol[4] = co[4] & ^co[5] & ^co[6] & ^co[7]
ol[5] = co[5] & ^co[6] & ^co[7]
ol[6] = co[6] & ^co[7]
ol[7] = co[7]
```

UNITED STATES PATENT AND TRADEMARK OFFICE
CERTIFICATE OF CORRECTION

PATENT NO. : 5,008,850  
DATED : April 16, 1991  
INVENTOR(S) : Eric Jensen

Page 3 of 8

It is certified that error appears in the above-identified patent and that said Letters Patent is hereby corrected as shown below:

In Appendix A of the patent, column 8 lines 50 and 51 of the "In geneeral, ol[n] = co[i] & co[n] & co[n-1] & ... co [i+1], where i=0, ..., n-1." should bee replaced with -- In general, ol[n]= co[n], ol[i] = co[i] & ^co[n] & ^co[n-1] & ...^co[i+1], where i = 0, ..., n-1--.

In Appendix A of the patent, column 8, the table on lines 53 through 64 should be replaced with the following table:

```
t[0] = co[0] | ^b[0]
t[1] = co[1] | ^b[1]
t[2] = co[2] | ^b[2]
t[3] = co[3] | ^b[3]
t[4] = co[4] | ^b[4]
t[5] = co[5] | ^b[5]
t[6] = co[6] | ^b[6]
t[7] = co[7] | ^b[7]
```

UNITED STATES PATENT AND TRADEMARK OFFICE
CERTIFICATE OF CORRECTION

PATENT NO. : 5,008,850
DATED : April 16, 1991
INVENTOR(S) : Eric Jensen

It is certified that error appears in the above-identified patent and that said Letters Patent is hereby corrected as shown below:

In Appendix A of the patent, column 8, line 66 of the patent "In general, t[i] = co[i] | b[i] where i = 0, ..., n." should be replaced with --In general, t[i] = co[i] | ^b[i] where i = 0, ..., n.--.

In Appendix A of the patent, column 9, the table on lines 18-27 should be replaced with:

<u>Group Size</u> is: gs[7. .0]
gs[0] = ct[0] & ^ct[1] & ^ct[2] & ^ct[3] & ^ct[4] & ^ct[5] & ^ct[6] & ^ct[7]
gs[1] = ct[1] & ^ct[2] & ^ct[3] & ^ct[4] & ^ct[5] & ^ct[6] & ^ct[7]
gs[2] = ct[2] & ^ct[3] & ^ct[4] & ^ct[5] & ^ct[6] & ^ct[7]
gs[3] = ct[3] & ^ct[4] & ^ct[5] & ^ct[6] & ^ct[7]
<u>gs</u>[4] = ct[4] & ^ct[5] & ^ct[6] & ^ct[7]
gs[5] = ct[5] & ^ct[6] & ^ct[7]
gs[6] = ct[6] & ^ct[7]
gs[7] = ct[7]

UNITED STATES PATENT AND TRADEMARK OFFICE
CERTIFICATE OF CORRECTION

PATENT NO. : 5,008,850

DATED : April 16, 1991

INVENTOR(S) : Eric Jensen

It is certified that error appears in the above-identified patent and that said Letters Patent is hereby corrected as shown below:

In Appendix A of the patent, column 9, lines 29-31 of the patent "In general, gs[n] = ct[n], gs[i] = ct[i] & ct[n] & ct[n-1] & ... ct[i+1] where i = 1, ... n-1. where means NOT" should be replaced with --In general, gs[n] = ct[n], gs[i] = ct[i] & ^ct[n] & ^ct[n-1] & ... ^ct[i+1] where i = 1, ... n-1. Where ^ means NOT--.

In claim 5, column 11, delete line 6 of the patent insert therein

--OL[i] = CO[i] & ^CO[n] & ^CO[n-1] & ... ^CO[i+1]--.

In claim 5, column 11, line 17 of the patent "means NOT, and" should be replaced with --^ means NOT, and--.

In claim 7, column 11, delete lines 40-43 of the patent and insert therein

--OL[i] = CO[i] & ^CO[n] & ^CO[n-1] & ... ^CO[i+1] for i = 0 ..., n-1

T[i] = CO[i] | ^b[i]--.

In claim 7, column 11, delete line 48 of the patent and insert therein

--GS[i] = CT[i] & ^CT[n] & ^CT[n-1] & ... CT[i+1]--.

UNITED STATES PATENT AND TRADEMARK OFFICE
CERTIFICATE OF CORRECTION

PATENT NO. : 5,008,850
DATED : April 16, 1991
INVENTOR(S) : Eric Jensen

It is certified that error appears in the above-identified patent and that said Letters Patent is hereby corrected as shown below:

In claim 7, column 11, line 63 of the patent "means NOT," should be replaced with --^ means NOT,--.

In claim 16, column 14, line 46 of the patent "OL[i] = CO[i] & CO[7] & CO[6] & ... CO[i+1]" should be replaced with --OL[i] = CO[i] & ^CO[7] & ^CO[6] & ... ^CO[i+1]--.

In claim 16, column 14, line 56 of the patent "means NOT, and" should be replaced with --^ means NOT, and--.

In claim 16, column 15, delete lines 13-15 of the patent and insert therein
--OL[i] = CO[i] & ^CO[7] & ^CO[6] & ... ^CO[i+1]
for i = 0 ..., 6
T[i] = CO[i] | ^b[i]--.

In claim 16, column 15, line 35 of the patent "means NOT," should be replaced with --^ means NOT,--.

In claim 21, column 15, line 66 of the patent "OL[i] = CO[i] & CO[3] & CO[2] & ... CO[i+1]" should be replaced with --OL[i] = CO[i] & ^CO[3] & ^CO[2] & ... ^CO[i+1]--.

UNITED STATES PATENT AND TRADEMARK OFFICE
CERTIFICATE OF CORRECTION

PATENT NO. : 5,008,850

DATED : April 16, 1991

INVENTOR(S) : Eric Jensen

Page 7 of 8

It is certified that error appears in the above-identified patent and that said Letters Patent is hereby corrected as shown below:

In claim 21, column 16, line 7 of the patent "means NOT, and" should be replaced with --^ means NOT, and--.

In claim 23, column 16, line 32 of the patent "OL[i] = CO[i] & CO[3] & CO[2] & ... CO[i+1]" should be replaced with --OL[i] = CO[i] & ^CO[3] & ^CO[2] & ... ^CO[i+1]--.

In claim 23, column 16, line 34 of the patent "T[i] = CO[i] | b[i]" should be replaced with --T[i] = CO[i] | ^b[i]--.

In claim 23, column 16, line 39 of the patent "GS[i] = CT[i] & CT[3] & CT[2] & ... CT[i+1]" should be replaced with --GS[i] = CT[i] & ^CT[3] & ^CT[2] & ... CT[i+1]--.

In claim 23, column 16, line 54 of the patent "means NOT," should be replaced with --^ means NOT,--.

In claim 33, column 20, line 13 of the patent "OL[i] = CO[i] & CO[3] & CO[2] & ... CO[i+1]" should be replaced with --OL[i] = CO[i] & ^CO[3] & ^CO[2] & ... ^CO[i+1]--.

In claim 33, column 20, line 21 of the patent "means NOT, and" should be replaced with --^ means NOT, and--.

UNITED STATES PATENT AND TRADEMARK OFFICE
CERTIFICATE OF CORRECTION

PATENT NO. : 5,008,850
DATED : April 16, 1991
INVENTOR(S) : Eric Jensen

It is certified that error appears in the above-identified patent and that said Letters Patent is hereby corrected as shown below:

In claim 35, column 20, line 45 of the patent "OL[i] = CO[i] & CO[3] & CO[2] & ... CO[i+1]" should be replaced with --OL[i] = CO[i] & ^CO[3] & ^CO[2] & ... ^CO[i+1]--.

In claim 35, column 20, line 48 of the patent "T[i] = CO[i] | b[i]" should be replaced with --T[i] = CO[i] | ^b[i]--.

In claim 35, column 20, line 52 of the patent "GS[i] = CT[i] & CT[3] & CT[2] & ... CT[i+1]" should be replaced with --GS[i] = CT[i] & ^CT[3] & ^CT[2] & ... CT[i+1]--.

In claim 35, column 20, line 66 of the patent "means NOT," should be replaced with --^ means NOT,--.

Signed and Sealed this

Thirteenth Day of December, 1994

Attest:

BRUCE LEHMAN

Attesting Officer

Commissioner of Patents and Trademarks